FIG. I

INVENTOR:
FRANK BEVILACQUA
ATTORNEY

June 22, 1965  F. BEVILACQUA  3,190,807
PRESSURE TUBE REACTOR
Filed Sept. 7, 1960  3 Sheets-Sheet 2

INVENTOR:
FRANK BEVILACQUA
BY Eldon H. Luther
ATTORNEY

June 22, 1965 F. BEVILACQUA 3,190,807
PRESSURE TUBE REACTOR
Filed Sept. 7, 1960 3 Sheets-Sheet 3

INVENTOR:
FRANK BEVILACQUA
BY
Eldon H. Luther
ATTORNEY

United States Patent Office 3,190,807
Patented June 22, 1965

3,190,807
PRESSURE TUBE REACTOR
Frank Bevilacqua, Clearwater, Fla., assignor, by mesne assignments, to Combustion Engineering, Inc., a corporation of Delaware
Filed Sept. 7, 1960, Ser. No. 54,536
10 Claims. (Cl. 176—59)

This invention relates generally to reactors and has particular relation to an improved reactor of the pressure tube type.

Pressure tube reactors are well known with these reactors employing a relatively large number of small tubes which are disposed in closely spaced relation with the tubes being generally parallel and with the tubes extending through a so-called moderator tank or container within which is disposed a suitable neutron moderator. The tubes contain a fissionable material and a fluid distribution arrangement is provided for passing a cooling medium through the tubes. This reaction design has advantages in certain installations with one of the main advantages, as compared with a reactor employing a pressure vessel, being that in high pressure installations it is substantially more economical to build the pressure tube arrangement. In addition the detection of failed fuel elements and the incremental loading of fuel is accomplished more easily. However, one of the difficult problems encountered with pressure tube reactors is the relatively complicated distribution system that is required to convey a cooling medium through each of the pressure tubes of the reactor. Since the tubes are in relatively closely spaced relation, and with prior art arrangements are parallel, the tube extremities are in very close proximity to each other requiring a maze of piping and fittings that must be installed in close quarters which makes it a difficult task to assemble the reactor and also makes it difficult to provide adequate access to the tubes for refueling and other necessary operations.

The present invention is concerned with alleviating this relatively troublesome problem, and the invention is particularly well adapted for use with pressure tube reactors employing $D_2O$ or graphite as the moderator in the moderator tank although it may be employed where other moderators are utilized. In accordance with this invention the pressure tubes are disposed in horizontal planes which are in juxtaposed vertically spaced relation throughout the height of the moderator tank. The tubes in a single plane are parallel with the tubes in adjacent planes or adjacent pairs of planes being disposed crosswise to each other, thereby providing a cross-latticed arrangement. The aforementioned moderators, i.e. $D_2O$ and graphite, have moderating characteristics which readily permit the fuel to be arranged in this cross-latticed configuration. The use of moderators, such as light water or organic moderators are not as suitable as $D_2O$ or graphite since a peaking of the neutron flux may occur as a result of the cross-lattice and to an extent which may cause difficulty. When using moderators other than $D_2O$ or graphite, as for example when using $H_2O$ or BeO, great care must be taken in designing the core to insure that large flux variations are not encountered in the core and excessive hot spots are not produced. The nuclear effect of $D_2O$ and graphite is such that lumped fuel arrangements are permissible with these moderators so that the cross-latticed arrangement is well adapted for use with these moderators.

By arranging adjacent groups of tubes in the cross-wise relation mentioned the extremities of these divergently directed tubes, of course, terminate in remote locations from each other thereby alleviating the congestion in providing connections in these tube ends for passage of coolant therethrough, which congestion was a characteristic of the pressure tube reactors in which all the tubes were parallelly disposed.

Accordingly it is an object of this invention to provide an improved pressure tube reactor.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of the invention as shown by the accompanying drawings wherein.

Figure 1:
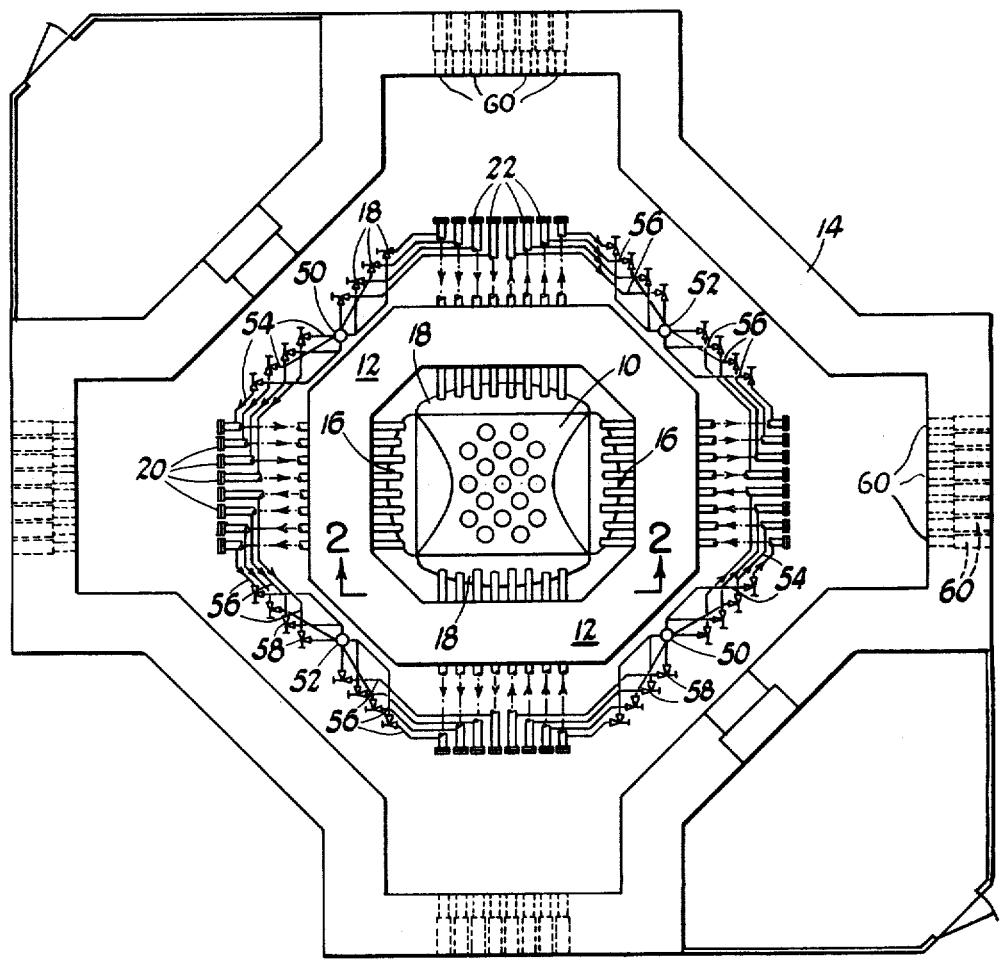
FIG. 1 is a top plan view of a pressure tube nuclear reactor employing the present invention.

Referring now to the drawings, wherein like reference numerals are used throughout to illustrate like elements, the preferred embodiment of the invention depicted therein includes a moderator tank or chamber 10 which is filled with a neutron moderator and preferably $D_2O$ or graphite and which tank is contained within a relatively thick walled housing 12 that is constructed of a material capable of providing a neutron and gamma shield. This housing, in turn, is retained within the relatively thick walls 14 which are of a material that provides further neutron and gamma ray shielding and in addition form a chamber for the unloading of fuel isolated from the rest of the plant.

Figure 2:
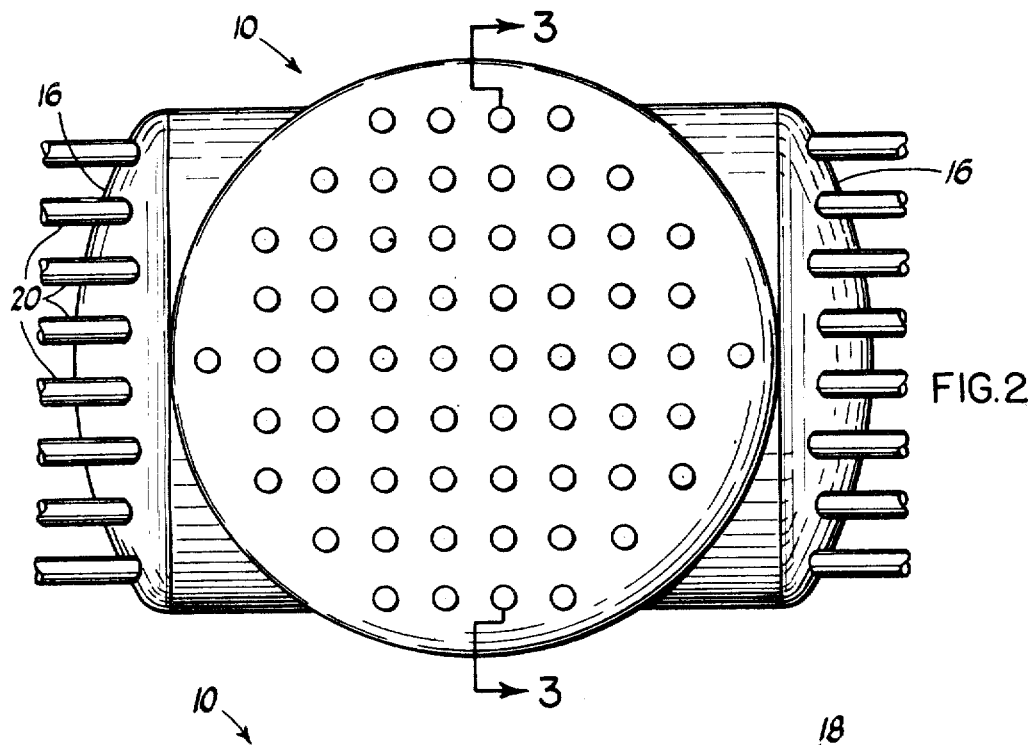
FIG. 2 is a fragmentary side view primarily of the reactor core with this view taken from line 2—2 of FIG. 1 with the moderator shield removed.
Figure 3:
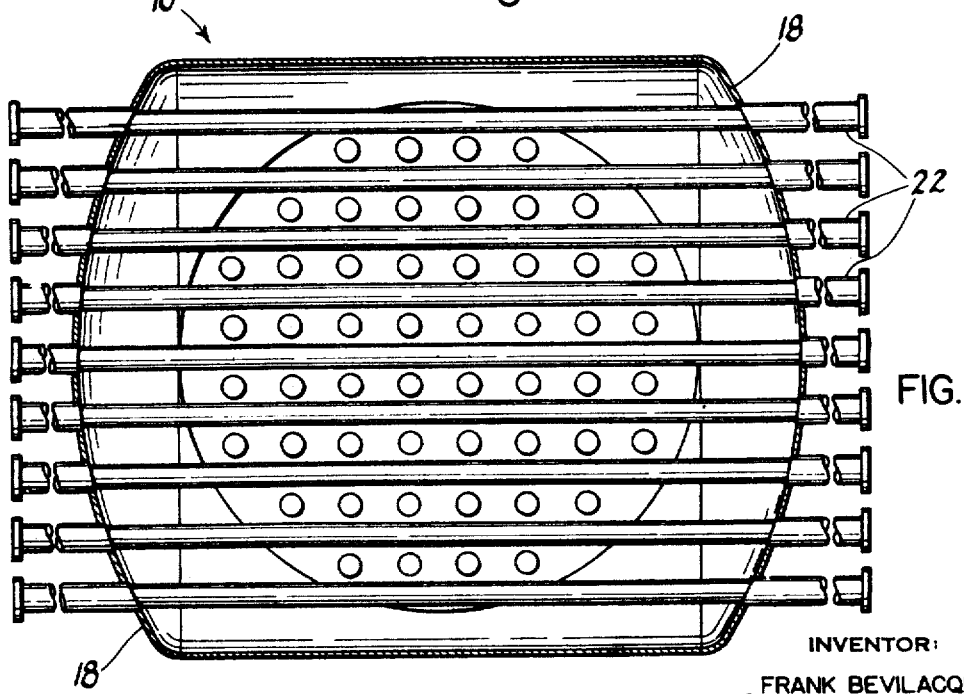
FIG. 3 is a sectional view taken generally along line 3—3 of FIG. 2.

As illustratively disclosed, the moderator tank 10 is provided with a pair of oppositely disposed end walls 16 and another similarly arranged pair of end walls 18 disposed at 90° to the former end walls and with the tank taking on the appearance of two cylindrical tanks intermeshed or interconnected so their axes are horizontal and in the same plane but are 90° to each other. The particular construction of the moderator tank is evident from a consideration of FIGS. 1, 2, and 3.

Figure 4:
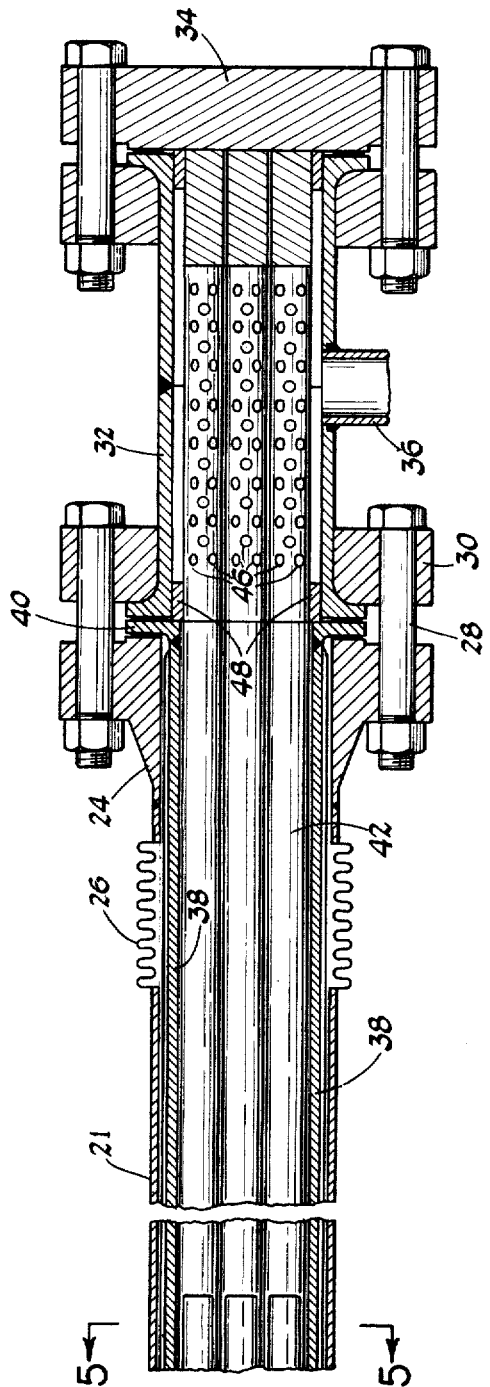
FIG. 4 is a fragmentary sectional view of one of the pressure tubes of the reactor.
Figure 5:
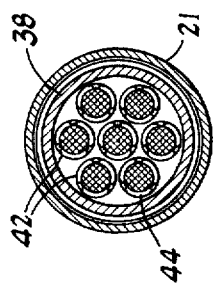
FIG. 5 is a sectional view taken generally along line 5—5 of FIG. 4.

Extending through tank 10 as well as housing 12 are a plurality of so-called pressure tubes, with there being one group of pressure tubes identified as 20 which extend through the end walls 16 and another group of tubes identified as 22 which extend through the end walls 18. As illustratively disclosed the tubes 20 and 22 are arranged cross-wise of each other and the tubes are arranged in horizontal planes with there being a number of tubes in each plane and with the tubes in each plane being parallel while the tubes in adjacent planes are crosswise to each other. With this arrangement, approximately one half the tubes of the reactor extend through end walls 16 while the other half extend through end walls 18, as illustrated in FIGS. 4 and 5.

Each of the pressure tubes includes an outer steel tube 21 which is interconnected with a suitable connecting flange 24 by means of expansible bellows 26. This flange 24, in turn, is connected by bolts 28 to collar 30 which is effective to secure the distribution sleeve 32 in place. This sleeve is capped at its end by means of closure 34, held in place as shown, and the sleeve is provided with a laterally extending connection 36 for conveying a cooling fluid to or from the sleeve interior. Steel tube 21 is welded to the end wall of the vessel, i.e. end wall 18 or 16, and extends from this end wall through the neutron shield housing 12. Disposed within tube 21 is the pressure tube 38, which is preferably made of a low neutron absorbing material such as aluminum or zirconium and which extends all the way through moderator tank 12, with this pressure tube having flange 40 provided at each end and which flange is securely clamped between the connecting flange 24 and the end of distribution sleeve 32 as shown in FIG. 4.

Disposed within pressure tube 38 are a plurality of fuel guide tubes 42 and within these tubes is disposed the nuclear fuel, i.e. fissionable material, such as uranium oxide slugs. The fuel guide tubes provide an annulus 44 through which a cooling fluid is conveyed, with openings 46 being provided in the wall of the guide tube at the location of the distribution sleeve 32 for the ingress and egress of the cooling fluid to and from this annulus. The tubes 42 are retained in their operative relation to each other by means of suitable guide members 43 which are formed so as to snugly receive these tubes. Accordingly, a cooling fluid such as $D_2O$ may be admitted at one end of the pressure tube through the connection 36, pass through the opening 46 and the length of the annulus 44 of each of the guide tubes and exit from the pressure tubes at the other end through a similar connection 36. It should be mentioned that the cooling fluid may be any desired cooling fluid employed for nuclear reactors and may be a gas or a liquid, with pressure tube gas cooled reactors currently being investigated with substantial interest. More than one cooling fluid may also be used since separate header systems may be employed for this purpose.

In the illustrative organization of FIG. 1, the cooling fluid is supplied to the tubes and collected therefrom by means of suitable piping and headers with there being two inlet headers (FIG. 1) 50 and two outlet headers 52. The inlet headers receive the cooling fluid from a suitable source, not here shown, and this fluid is conveyed through conduits 54 to the tubes 20 and 22 as shown with the arrows showing the direction of flow through the conduits to the pressure tubes. After passing through the pressure tubes the heated cooling medium is then conveyed to the outlet headers 52 through the tubes 56, with the arrows again indicating the direction of flow. From the outlet header 52 the heated fluid is conveyed to any desired location. Each of the inlet and outlet connecting tubes 54–56 is provided with a suitable control valve 58 so that the flow therethrough may be controlled as desired.

It will be appreciated that by arranging the tubes in the cross lattice configuration disclosed, the complexity of the piping and fittings, and particularly the congestion at the ends of the pressure tubes wherein the cooling fluid connections are made is substantially decreased. Furthermore by decreasing the congestion at the tube ends, access at these tube ends is facilitated so that the fuel within the tubes may be readily reached for loading and reloading operations, with openings 60 being provided in the biological shield walls 14 which correspond to the location of the tubes 21 and 22 so as to provide access to these tube ends.

In lieu of angularly directing adjacent rows of tubes, the rows of tubes may be angularly arranged in pairs with the tubes in each pair of rows being parallel but with adjacent pairs being angularly directed with relation to each other so that their ends terminate at different locations exteriorly of housing 12. Such an arrangement will give adequate access to the tube ends.

It should be noted that the angular relation of adjacent rows of tubes or adjacent pairs of rows need not be 90° as shown in the illustrative embodiment but need be only sufficient that the ends of the tubes of these rows will be displaced laterally to provide adequate access thereto.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A pressure tube reactor having a plurality of pressure tubes extending through a moderator container having a neutron moderator material therein, said tubes being formed into a plurality of groups with said groups being disposed in adjacent relation one after the other and with the tubes in alternate groups being parallel, said tubes in adjacent groups being disposed at a sufficient angle to one another so they emerge through different regions of said container and are laterally displaced from each other, the tubes in all the groups being in spaced parallel planes and the tubes in each respective group being disposed generally in not more than two juxtaposed parallel planes, said pressure tubes having a fissionable material disposed therein and means for passing a cooling fluid through each tube.

2. In a pressure tube reactor the combination of a moderator container having a moderator disposed therein selected from the group consisting of $D_2O$ and graphite, tube members extending through said container with said tubes being disposed in a cross lattice arrangement with the tubes formed into a plurality of groups with said groups being disposed in adjacent relation one after the other and with the tubes in alternate groups being parallel, said tubes in adjacent groups being crossed relative to each other, the tubes in all of the groups being in spaced parallel planes and the tubes of each respective group being disposed generally in not more than two juxtaposed parallel planes, said tube members having a fissionable material disposed therein and means to convey a cooling fluid under pressure through the tubes.

3. A pressure tube reactor comprising a moderator container having a neutron moderator disposed therein, a plurality of pressure tubes extending through said container and having a fissionable material therein, said tubes being formed into a plurality of groups with said groups being disposed in adjacent relation one after the other and with the tubes in alternate groups being parallel, said tubes of adjacent groups being oriented at approximately 90° to each other, the tubes in all the groups being in spaced parallel planes and the tubes in each respective group being disposed generally in not more than two juxtaposed parallel planes, supply and return headers for said tubes and connected therewith to convey a cooling fluid therethrough with these headers being normal to the planes of the tube groups and disposed intermediate the extremities of the groups.

4. A pressure tube nuclear reactor comprising a moderator tank having disposed therein a moderator selected from the group consisting of $D_2O$ and graphite, one group of tube members extending through said tank and disposed in parallel vertically spaced planes with the tube members being generally parallel, a second group of tube members disposed in planes parallel to the planes of the first group and interspersed alternately with relation to these last mentioned planes and with the tube members of the second group being parallel and oriented approximately at 90° with respect to the first group, said tubular members having a nuclear fuel disposed therein, a header positioned between the extremities of each of the groups of tubular members and extending normal to said planes, with each header being connected with generally half of the tubes of each of the groups adjacent thereto and with alternate headers being inlet headers and the others being outlet headers whereby a cooling fluid may be conveyed through the tubes.

5. A pressure tube nuclear reactor comprising a moderator tank having a neutron moderator material therein, one group of tube members extending through said tank and disposed in parallel spaced planes with the tube members being generally parallel, a second group of tube members extending through said tank and disposed in planes parallel to the planes of the first group and interspersed alternately with relation to these last mentioned planes and with the tube members of the second group being parallel to each other but oriented at a sufficient angle with respect to the tubes of the first group such that the tubes of the two groups emerge through different regions of the tank laterally displaced from each other, said tubular members having a nuclear fuel disposed therein, and means for passing a cooling fluid under pressure through each of the tubular members.

6. A pressure tube nuclear reactor comprising a moderator tank having disposed therein a moderator selected from the group consisting of $D_2O$ and graphite, one group of tube members extending through said tank and disposed in parallel spaced planes with the tube members being generally parallel, a second group of tube members extending through said tank and disposed in planes parallel to the planes of the first group and interspersed alternately with relation to these last mentioned planes and with the tube members of the second group being parallel to each other but oriented at a sufficient angle with respect to the tubes of the first group such that the tubes of the two groups emerge through different regions of the tank laterally displaced from each other, said tubular members each having a plurality of fuel elements disposed therein, and means for passing a cooling fluid under pressure through each of the tubular members.

7. A pressure tube nuclear reactor comprising a moderator tank having disposed therein a moderator selected from the group consisting of $D_2O$ and graphite, one group of tube members extending through said tank and disposed in parallel spaced planes with the tube members being generally parallel, a second group of tube members extending through said tank and disposed in planes parallel to the planes of the first group and interspersed alternately with relation to these last mentioned planes and with the tube members of the second group being parallel to each other but oriented approximately at 90° with respect to the first group such that the tubes of the two groups emerge through different regions of the tank laterally displaced from each other, said tubular members having a nuclear fuel disposed therein, and means for passing a cooling fluid under pressure through each of the tubular members.

8. A pressure tube reactor having a plurality of pressure tubes for receiving fissionable material, said tubes being disposed in relatively spaced relation and extending through a moderator tank containing a neutron moderator, fluid distribution means being provided for passing a cooling medium through the tubes with the tube extremities extending to the outside of said tank, characterized by the pressure tubes being disposed in a plurality of juxtaposed parallel planes, the tubes in each respective plane being parallel to and relatively spaced from each other and the tubes in some of said parallel planes being disposed at an angle relative to the tubes in other ones of said planes, with the tubes of at least one of the two planes juxtaposed to another plane being so disposed at an angle, said angle being of such a size that the extremities of the tubes in such relative angular position extend through different regions of said tank and are laterally displaced from each other in order to facilitate access to said extremities.

9. The pressure tube reactor of claim 8 wherein the tubes in alternate planes are disposed relative to each other at said angle.

10. The pressure tube reactor of claim 8 wherein said angle is at approximately 90°.

References Cited by the Examiner
UNITED STATES PATENTS

| | | | |
|---|---|---|---|
| 2,066,275 | 12/36 | Hall | 122—32 X |
| 2,920,874 | 1/60 | Gardner | 122—32 X |
| 2,938,845 | 5/60 | Treshow | 176—54 |
| 2,936,277 | 5/60 | MacNeill et al. | 176—35 |
| 2,975,115 | 3/61 | Wigner et al. | 176—87 |
| 2,999,057 | 9/61 | Hibshman | 176—47 |
| 3,094,473 | 6/63 | Humbach | 176—61 |

FOREIGN PATENTS

| | | |
|---|---|---|
| 212,305 | 1/58 | Australia. |
| 1,053,109 | 3/59 | Germany. |
| 782,888 | 9/57 | Great Britain. |

OTHER REFERENCES

Nucleonics, vol. 15, Number 11, November 1957, pp. 165–169.

CARL D. QUARFORTH, *Primary Examiner.*

ROGER L. CAMPBELL, LEON D. ROSDOL,
*Examiners.*